July 13, 1943.  E. E. JELLEY  2,324,087
ETCHING PROCESS
Filed June 25, 1942
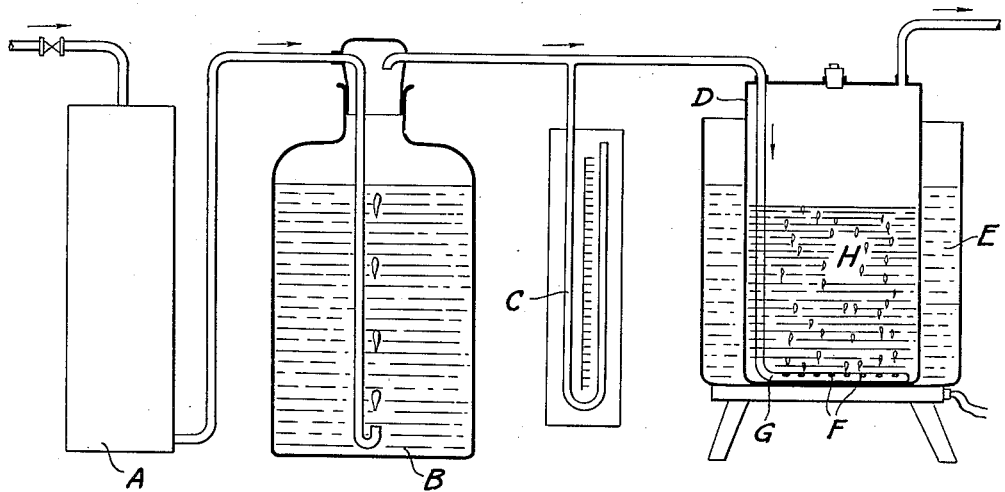
EDWIN E. JELLEY
INVENTOR
BY *[signature]*
ATTORNEY Patented July 13, 1943

2,324,087

UNITED STATES PATENT OFFICE 2,324,087

ETCHING PROCESS

Edwin E. Jelley, Rochester, N. Y., assignor to Eastman Kodak Company, Rochester, N. Y., a corporation of New Jersey Application June 25, 1942, Serial No. 448,433

2 Claims. (Cl. 41—42)

This invention relates to an improvement in the known processes of etching glass wherein the resist is wax or a wax composition and the etching agent is hydrofluoric acid. The wax resist is cut with a suitable engraving tool. In fine work such as is necessary, for instance, in making reticules for optical instruments, the accuracy of the dimensions of the etched line is very important. It is customary to expose the engraved blank to the vapor from a hot aqueous solution of hydrofluoric acid. Very careful control of the etching time is required, as the resist is permeable to the acid and there is but little difference in the time required for the acid to penetrate the resist and that required to etch the glass to the required depth. If the acid penetrates the resist and attacks the glass plate, the latter is said to be burned and is discarded. This is most likely to occur if the coating is thin or uneven, or if moisture from the air gets into the hydrofluoric acid vapor.

I have found that the addition of hydrocarbons to the hydrofluoric acid vapor will prevent, or at least greatly retard, its penetration through the wax. This is because the hydrocarbon forms a visible film on the wax, and so enters the interstices in its microcrystalline structure. Less accurate control is then necessary and fully etched clean lines may be consistently obtained. The hydrocarbon cannot be a solvent for the hydrofluoric acid because then, instead of decreasing the porosity, it conducts the acid through the resist.

The hydrocarbon must have the following properties: it must be inert to and a non-solvent for hydrofluoric acid; it must be inert to and adsorb to the wax; its boiling point should be lower than 200° C., preferably about 60° C. Both normal and branched hydrocarbons may be used. Among those which I have found useful are ligroin, benzene, gasoline, butane, pentane, hexane, heptane, octane and iso-octane. An indefinitely great number of hydrocarbons which meet the above specifications are capable of use. As far as wax resists are concerned, the aliphatic hydrocarbons give the best results of those which I have tried.

The following are examples of methods of carrying out my invention.

1. Anhydrous hydrofluoric acid from a cylinder is run into a gasometer or pressure chamber constructed of lead, copper or an inert plastic material. It is then diluted with dry air or nitrogen to the desired strength, between 5 and 90 percent, depending on the required etching speed. If air is used, it is passed through a suitable desiccating chamber and its moisture content reduced to below one percent humidity. The gaseous mixture is then passed through a vessel containing the hydrocarbon, ligroin, for instance. This vessel may be heated, but the temperature should not be allowed to rise more than a few degrees above that of the room or the wax will be flooded with hydrocarbon. The stream of gas containing hydrofluoric acid and hydrocarbon is then allowed to impinge on the glass surface, coated with a resist which has been engraved, for a length of time sufficient to produce the desired depth of etching.

2. Reference is made to the accompanying figure which is a formalized showing of the setup used. Air is dried by passage through a vessel A containing a large quantity of anhydrous calcium chloride. The dry air is then passed through a vessel B containing a hydrocarbon, such as ligroin or benzene. The current of dry air saturated with hydrocarbon is then passed from apertures F in tube G in through a lead vessel D, which contains a 60 per cent solution of hydrofluoric acid indicated at H. This lead vessel is heated in a constant temperature oil bath E in order to maintain the temperature of the acid between 20 and 40° C. The depth of acid in the vessel may be indicated by connecting a manometer C in the line between the hydrocarbon vessel B and the hydrofluoric acid vessel D. After passage through the vessel D, the dry air contains hydrocarbon vapor and hydrofluoric acid vapor. This mixture is then conducted to a suitable chamber where etching takes place. When the engraving consists of lines of different width, it becomes necessary to etch the wide lines correspondingly deeper than the fine lines. In this case, the engraved reticule is placed for a comparatively short time in the hydrofluoric acid-hydrocarbon vapor and is then taken away and held for a moment in a vessel containing air saturated with water vapor and hydrocarbon vapor. When this is done, the acid adhering to the lines continues to etch them, with the result that the wide lines are etched considerably deeper than the fine lines.

The improved process is applicable to resists consisting largely of wax, particularly paraffin wax or beeswax or other hard waxes which are best for engraving purposes. There are many common formulas in use such as those containing beeswax and asphalt in various proportions with or without gum copal and other ingredients.

Having thus described my invention, what I claim as new and desire to be secured by Letters Patent is:

1. In the process of etching glass by submitting to a stream of hydrofluoric acid in the vapor phase a sheet of glass having coated thereon a resist composed largely of wax and having lines engraved therein, the improved step which comprises incorporating in the vapor stream a hydrocarbon having the following physical properties: it is inert to hydrofluoric acid, glass and the wax resist; it is adsorbed to wax, and it has a boiling point below 200° C.

2. In the process of etching glass by submitting to a stream of hydrofluoric acid in the vapor phase a sheet of glass having coated thereon a resist composed largely of wax and having lines engraved therein, the improved step which comprises incorporating in the vapor stream a hydrocarbon having the following physical properties: it is inert to hydrofluoric acid, glass and the wax resist; it is adsorbed to wax, and it has a boiling point of the order of 60° C.

EDWIN E. JELLEY.